Dec. 29, 1931.  C. E. SMITH  1,838,457
AIRCRAFT
Filed Nov. 5, 1929   2 Sheets-Sheet 1

INVENTOR.
Charles E. Smith
BY
ATTORNEY

Dec. 29, 1931.　　　C. E. SMITH　　　1,838,457
AIRCRAFT
Filed Nov. 5, 1929　　　2 Sheets-Sheet 2

INVENTOR.
Charles. E. Smith
BY Baldwin Vau
ATTORNEYS.

Patented Dec. 29, 1931

1,838,457

UNITED STATES PATENT OFFICE

CHARLES E. SMITH, OF OROVILLE, CALIFORNIA

AIRCRAFT

Application filed November 5, 1929. Serial No. 404,878.

This invention relates to aircraft and more particularly to propellers for airplanes, dirigibles and the like.

The principal object of the invention is to increase the efficiency of propelled aircraft.

A further object is to reduce air resistance by shielding the motor and merging the propelling mechanism into the stream lines of the craft.

Another object is to reduce cavitation behind the propeller and improve the cooling effect of the motor. Other objects and advantages will appear as the description progresses.

In this specification and the accompanying drawings the invention is disclosed in its preferred form. But it is to be understood that it is not limited to this form because it can be embodied in other forms. It is also to be understood that in and by the claims following the description it is desired to cover the invention in whatsoever form it may be embodied.

Figure 1:
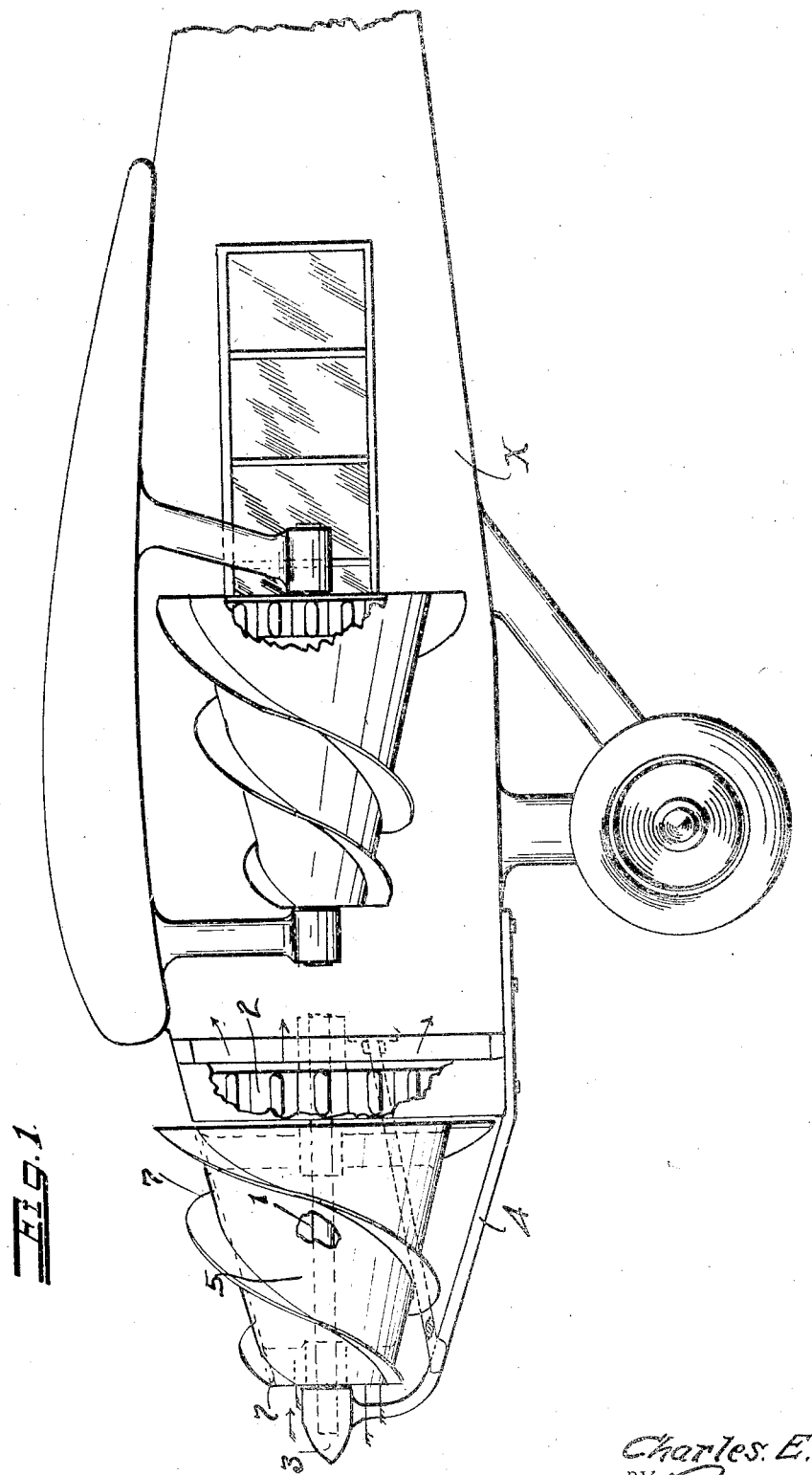
Figure 1 is a diagrammatic side elevation of a conventional airplane equipped with propellers in accordance with this invention.

In detail the construction illustrated in the drawings comprises the driven shaft 1. In Figure 1 this shaft is shown coaxial with the fuselage of the airplane and as a continuation of the shaft of the motor 2.

The motor may be attached to the nose of the airplane in the usual manner and the shaft 1 made rigid enough to be supported as an overhanging extension of the motor shaft or its outer end may be supported at 3 in the outboard tubular support 4.

Figure 2:
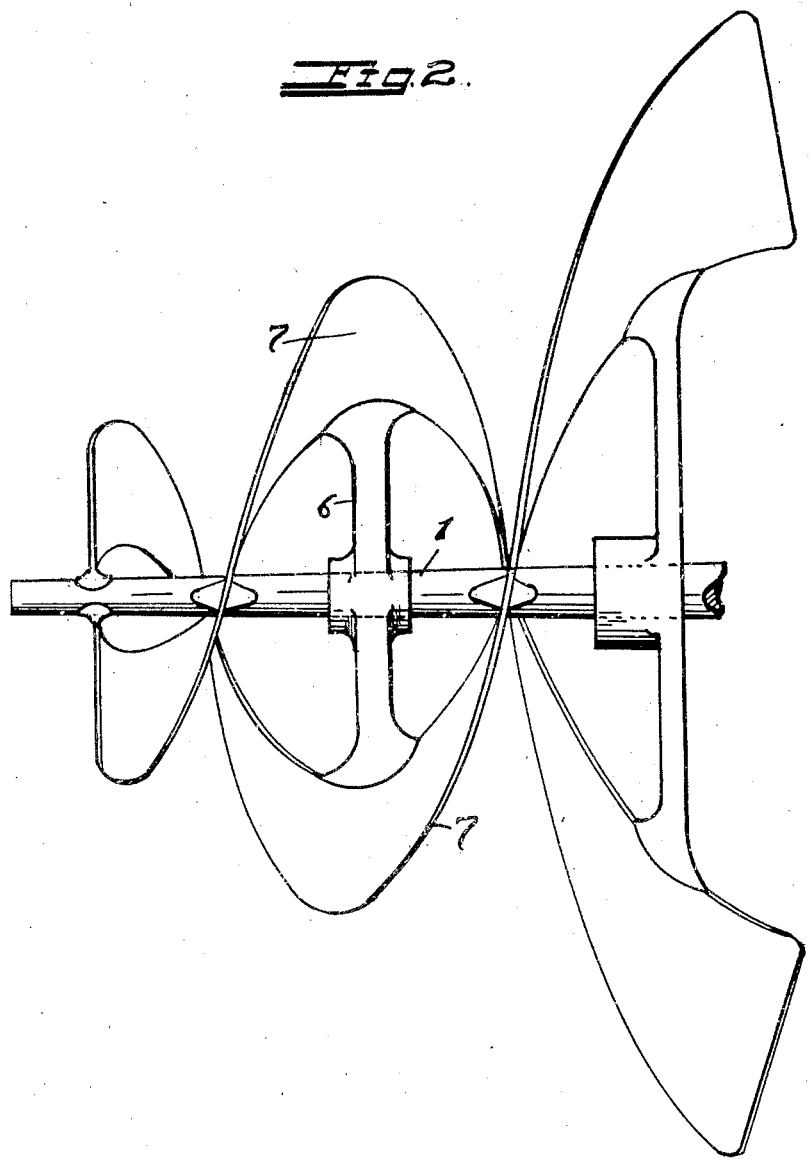
Figure 2 is an enlarged side elevation of a modified form of the invention.

The conical shield 5 is fixed to this shaft by suitable spiders such as 6 in Figure 2. It tapers from the outside diameter of the motor to a diameter of about one foot at the outer end. It may be a straight cone as shown or parabolic to merge into the stream lines of the fuselage X.

The spiral vanes 7—7 begin at the small end 3 and extend spirally around the perimeter of the cone 5 to which they are fixed.

These vanes preferably have an increasing height from front to back and their number and pitch will be determined by the motor r. p. m., the desired travel speed, and other incidental conditions known to those skilled in the art.

The air engaged by the forward ends of the vanes is thrust backward by the vanes, thus giving a forward impulse to the propeller and the craft to which it is attached.

The cone 5 tends to compact the air and maintain its density, for the vanes to react against, increasing the propulsive efficiency.

In multiple motor aircraft the propeller and enclosed motor may be installed below the wings, as shown in Figure 1. The propellers may be located on the aircraft in any and all suitable points of advantage.

The air entering the open front end 3 of the cone flows back over the enclosed motor, maintaining the desired thermal efficiency, while the aircraft is in motion. The motor can be more quickly "warmed up" while on the ground, due to its enclosure within the cone 5 and not subjected to the air thrust backward by the vanes 7. Provision can be made to open and close the front end 3 to regulate the quantity of air directed against the motor 2 through the vane.

In Figure 2 the cone 5 is omitted, the vanes 7—7 being connected directly to the spiders 6. This type is effective as a propeller but it subjects the motor to blast of the air discharged from the vanes.

The cone 5 also acts to muffle some of the noise of the motor and to protect it from inclement weather.

The motor may be installed within the forward part of the fuselage and connected with the propeller forming the nose of the fuselage and the exhaust carried downwardly and rearwardly to muffle the noise, as shown in Figure 1; or the motor can be installed within the shell 5 as indicated in the lateral propeller under the wing in Figure 1.

Having thus described this invention what I claim and desire to secure by Letters Patent is:

1. An aircraft propeller comprising a shaft, a tapered shell open to the atmosphere at both ends, and fixed to said shaft, a helical vane of progressively increasing height surrounding said shell, and a motor engaging said shaft behind the larger open end of said shell.

2. An aircraft propeller comprising a shaft, a substantially conical hollow shell open to the atmosphere at both ends, and fixed to said shaft, a helical vane of progressively increasing height surrounding said shell, and a motor engaging said shaft behind the larger open end of said shell and adapted to be cooled by air passing through the hollow shell.

In testimony whereof I have hereunto set my hand this 23rd day of October, A. D. 1929.

CHARLES E. SMITH.